R. SOLOMON.
PACKINGLESS VALVE.
APPLICATION FILED OCT. 27, 1919.

1,374,774.                                      Patented Apr. 12, 1921.

Inventor
R. Solomon
A. L. Hough
By
Attorney

UNITED STATES PATENT OFFICE.

RANDOLPH SOLOMON, OF ALEXANDRIA, VIRGINIA, ASSIGNOR OF ONE-HALF TO G. HENRY SHRYOCK, OF HERNDON, VIRGINIA.

PACKINGLESS VALVE.

1,374,774.  Specification of Letters Patent.  Patented Apr. 12, 1921.

Application filed October 27, 1919. Serial No. 333,505.

*To all whom it may concern:*

Be it known that I, RANDOLPH SOLOMON, a citizen of the United States, residing at Alexandria, in the county of Alexandria and State of Virginia, have invented certain new and useful Improvements in Packingless Valves, of which the following is a specification, reference being had therein to the accompanying drawing.

This invention relates to new and useful improvements in packingless valves, for steam, hot water and fluid pipes, and comprises a simple and efficient device of this nature having various details of construction and combinations of parts as will be hereinafter fully described and then specifically defined in the appended claims.

Figure 1:
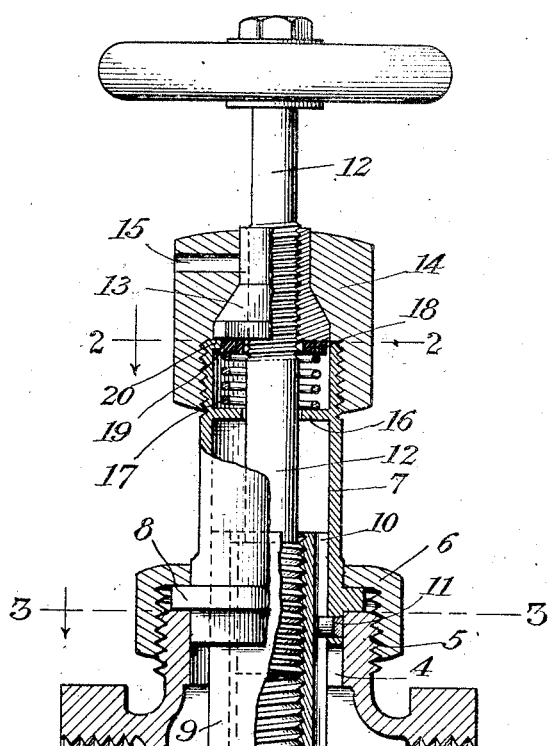
Figure 2:
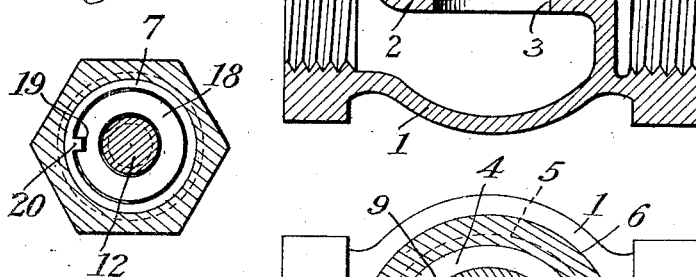
Figure 3:
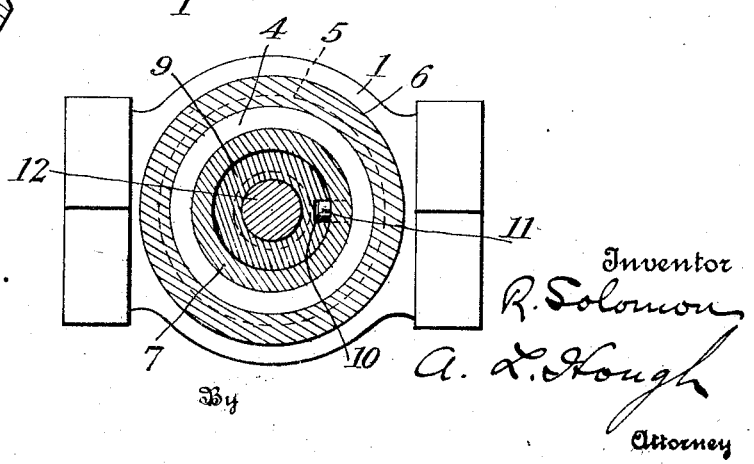

My invention is clearly illustrated in the accompanying drawings, which, with the letters of reference marked thereon form a part of this application and in which drawings, Figure 1 is a central vertical sectional view through the valve casing and parts therein, Fig. 2 is a cross sectional view taken on line 2—2 of Fig. 1, and Fig. 3 is a cross sectional view taken on line 3—3 of Fig. 1.

Reference now being had to the details of the drawings by numerals, 1 designates a valve casing of the usual globe type having a partition 2 therein which has an opening 3 therein, the wall of which is tapering. The wall of the casing is provided with an opening with a boss 4 about the marginal edge thereof, which has circumferential threads 5 formed thereon for the reception of the nut 6 which has an annular shoulder in the wall of its recess. A cylindrical open ended shell or bonnet 7, has its lower end fitted within said opening in the valve casing, and is provided with an integral collar 8 which rests upon said boss to support the shell. The valve 9 is of cylindrical shape and has a tapering head adapted to engage said beveled seat in the partition of the valve casing. A longitudinal groove 10 is formed in the outer surface of the cylindrical shank portion of the valve, and 11 is a lug projecting from the inner wall of said cylindrical shell, and is designed to engage in said groove and serves as a guide for the valve as it reciprocates within the cylindrical shell. Said nut, it will be noted, when screwed to its engaging relation with the boss of the valve casing, seats upon said integral collar, and makes a tight joint.

A threaded rod or stem 12 is adapted to engage interior threads formed within the cylindrical shank portion of the valve, and has a bearing member 13 interiorly threaded and mounted with a close fit upon a threaded portion of said rod, the outer surface of said bearing member being cylindrical a portion of its length and also tapering or conical shape for a portion of its length. The cylindrical part of the bearing member occupies a portion of the bore in the nut 14, and the conical or tapering portion has a bearing against a tapering surface within the bore of said nut 14. The circumference of the outer portion of said cylindrical shell is threaded for engagement with the threads formed on the inner surface of the nut 14, and the wall of the nut 14 is provided with oil holes 15, one only being shown to permit the moving parts within to be sufficiently lubricated.

Said cylindrical shell has an annular shoulder 16 formed on its inner surface a short distance from the outer end of the shell, and 17 is a coiled spring mounted upon the shank portion of threaded rod, and is of such a diameter as to fit within the shell. A washer 18, with a notch 19 in its circumference is fitted upon the threaded rod and a lug 20 projecting from the inner surface of the shell near its outer end, engages in the notch of the washer, and serves to hold the latter from rotation. The outer end of the coiled spring engages said washer, and tends to hold the washer against the flaring end of the bearing member 13. Said spring is of sufficient strength to at all times hold the bearing member seated in the nut 14, regardless of whether the threaded rod is turned in one direction or the other. The inner end of the bearing member is angularly outlined for engagement with a wrench when desired, and the nuts and shell are of sufficient thickness to withstand any pressure to which they may be subjected.

By the provision of a packingless valve made in accordance with my invention it will be noted that there will be no appreciable wear upon the stem of the valve, and wear between the conical or tapering portion of the bearing member and the nut 14 will be automatically taken up by the spring, and a secure means is provided for guiding the valve as it is moved toward or away from its seat, the valve when closed making a thoroughly leak proof joint.

What I claim to be new is,

1. A packingless valve comprising in combination a valve casing having a valve seat, a valve adapted to engage said seat and provided with a cylindrical internally threaded portion, a tubular shell adapted to be secured to said valve casing and to inclose the upper portion of said cylindrical part of the valve member, a rod projecting into said shell and threaded at its lower end for engagement with said cylindrical portion and provided intermediate its end with a second threaded portion, a truncated cone shaped bearing member threaded on said intermediate threaded portion of said rod, and a nut inclosing said bearing member and threaded on the end of said shell.

2. A packingless valve, including a bonnet exteriorly threaded at one end, a nut threaded on said end, and having an internal truncated, cone shaped bearing surface, the valve having a stem provided with a threaded portion near one end, a wear member disposed in said nut and having a truncated cone shaped exterior face, engaging said internal bearing surface of the nut, and having a threaded bore engaging the threaded portion of said valve stem, and means for yieldingly holding said wear member against said internal bearing surface of the nut.

In testimony whereof I hereunto affix my signature.

RANDOLPH SOLOMON.